(12) United States Patent
Babak

(10) Patent No.: US 10,280,832 B2
(45) Date of Patent: May 7, 2019

(54) TURBINE DE-SWIRL ELEMENTS

(71) Applicant: Honeywell International Inc., Morris Plains, NJ (US)

(72) Inventor: Martin Babak, Velka Bites (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 75 days.

(21) Appl. No.: 15/467,933

(22) Filed: Mar. 23, 2017

(65) Prior Publication Data

US 2018/0274435 A1    Sep. 27, 2018

(51) Int. Cl.
*F02B 33/44*    (2006.01)
*F02B 37/00*    (2006.01)
*F01D 9/04*    (2006.01)
*F01D 5/04*    (2006.01)

(52) U.S. Cl.
CPC .............. *F02B 37/00* (2013.01); *F01D 9/048* (2013.01); *F01D 5/046* (2013.01); *F05D 2220/40* (2013.01)

(58) Field of Classification Search
CPC ........... F02B 37/00; F02B 39/00; F04D 29/30
USPC ........................................................ 60/605.1
See application file for complete search history.

(56) References Cited

U.S. PATENT DOCUMENTS

| | | | |
|---|---|---|---|
| 6,925,806 | B1 | 8/2005 | Zollinger et al. |
| 7,631,497 | B2 * | 12/2009 | Panek .................... F01D 25/186 60/605.1 |
| 2002/0184882 | A1 | 12/2002 | Daudel et al. |
| 2016/0265484 | A1 * | 9/2016 | Annati .................... F02B 37/24 |

FOREIGN PATENT DOCUMENTS

| | | |
|---|---|---|
| EP | 2 762 682 A2 | 8/2014 |
| EP | 2 940 253 A1 | 11/2015 |
| WO | 2008/036862 A2 | 3/2008 |

OTHER PUBLICATIONS

"Communication" including an Extended European Search Report, for corresponding European Patent Application EP 18162434.7, dated Jun. 6, 2018, performed by the EPO.

* cited by examiner

*Primary Examiner* — Ngoc T Nguyen
(74) *Attorney, Agent, or Firm* — The Law Office of John A. Griecci

(57) ABSTRACT

A turbocharger including a turbocharger housing, a rotor and a heat shroud. The turbocharger housing includes a turbine housing affixed to a bearing housing. The rotor includes an axial turbine wheel with a hub, and a shaft extending through the bearing housing. The hub defines a back-disk surface that faces the bearing housing, and the bearing-housing defines an outer surface facing the turbine hub. The turbine housing forms a radial scroll, and the heat shroud forms a curved portion turning that radial scroll direction to an axial direction. The heat shroud establishes a back-disk cavity between a bearing-housing turbine-end-wall outer surface, the turbine-wheel back-disk surface, the curved portion of the heat shroud, and a cylindrical outer surface of a turbine-end portion of the shaft. The heat shroud includes flat ribs within the back-disk cavity to impede the circumferential flow of exhaust gas within the back-disk cavity.

8 Claims, 5 Drawing Sheets

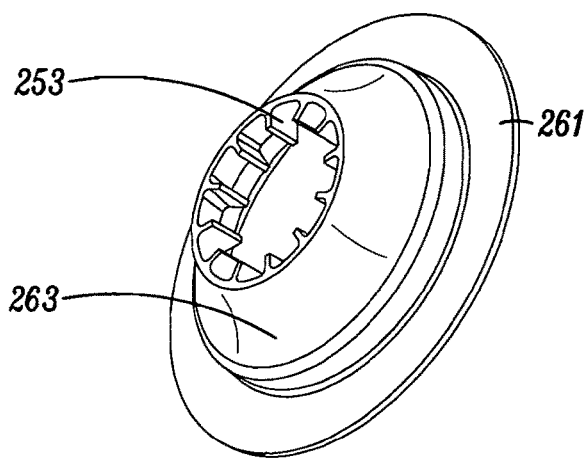
FIG. 5
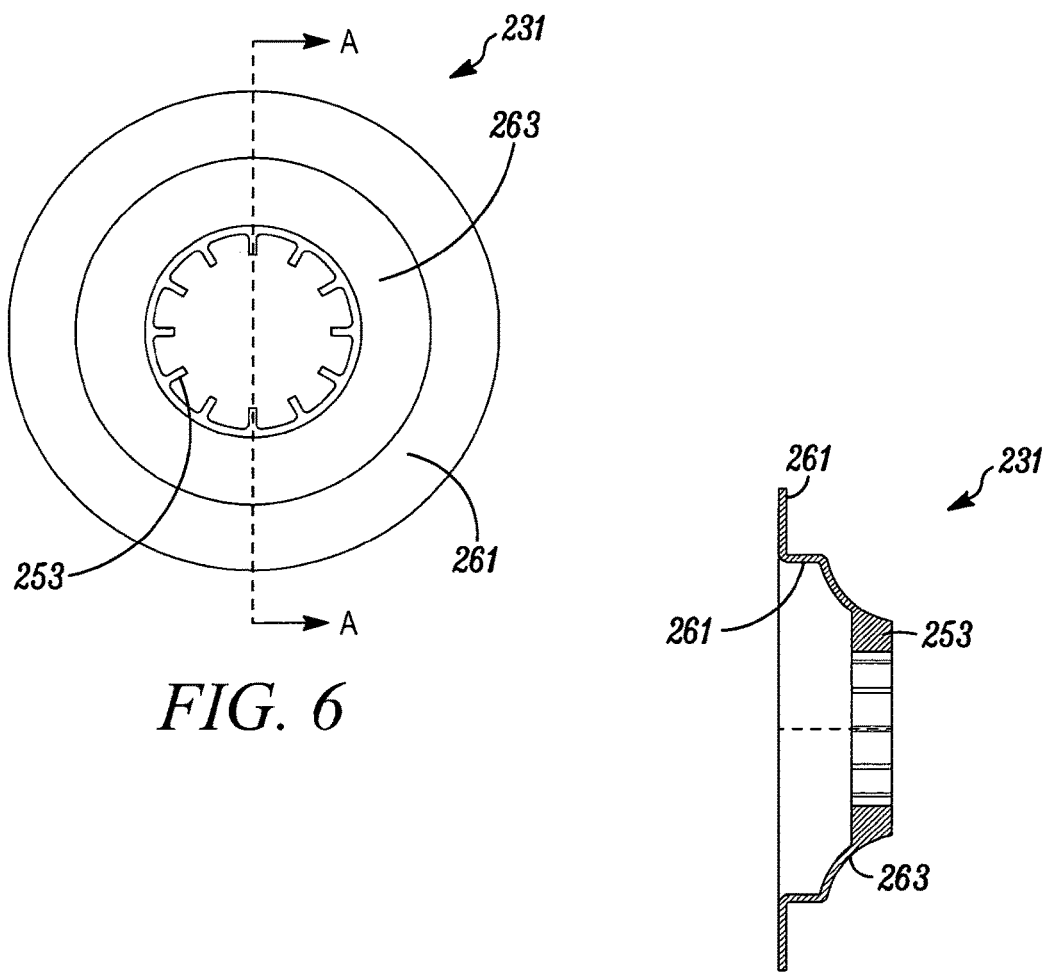
FIG. 6
FIG. 7

TURBINE DE-SWIRL ELEMENTS

The present invention relates generally to turbochargers and, more particularly, to an axial turbine having elements to minimize oil leakage from the bearings into the turbine.

BACKGROUND OF THE INVENTION

With reference to FIG. 1, a typical turbocharger 101 has a turbine that includes a turbocharger housing and a rotor configured to rotate within the turbocharger housing around an axis of rotor rotation 103 on oil-lubricated thrust bearings and two sets of oil-lubricated journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

U.S. Pat. No. 8,453,448, dated Jun. 4, 2013, which is incorporated herein by reference for all purposes, discloses a turbocharger similar to that of FIG. 1, but which has an axial turbine wheel. The axial turbine wheel inherently has a lower moment of inertia than an equivalent radial turbine, reducing the amount of energy required to accelerate the turbine. As can be seen in FIG. 2 of that patent, the turbine has a scroll passageway that circumferentially receives exhaust gas and (with reference to FIG. 1) axially restricts the flow to transition it to a highly swirling axial flow. It thus impacts the leading edge of the turbine blades in a generally axial and circumferential direction.

The scroll passageway of the patent is characterized by a significant enough radial reduction to accelerate exhaust gas such that a significant portion of the total pressure of the exhaust gas received by the turbine is converted into dynamic pressure. This allows an appropriately configured blade to extract a significant amount of energy from the exhaust gas without significantly changing the static pressure across the turbine blades, thus the exhaust gas stream applies little to no axial pressure on the rotor. Nevertheless, the low static pressure at the downstream end of the scroll passageway increases the potential that oil from the bearing housing could leak into the turbine housing.

Accordingly, there has existed a need for a turbocharger turbine having a low moment of inertia, and with a low likelihood of oil leaking from the bearing housing into the turbine housing. Preferred embodiments of the present invention satisfy these and other needs, and provide further related advantages.

SUMMARY OF THE INVENTION

In various embodiments, the present invention solves some or all of the needs mentioned above, typically providing a cost effective turbocharger turbine characterized by a low moment of inertia and a low likelihood of oil leaking from the bearing housing into the turbine housing.

The invention provides a turbocharger configured to receive an exhaust gas stream from an engine, and to compress input air into a pressurized air stream. The turbocharger includes a turbocharger housing, a rotor rotatably mounted within the turbocharger housing to rotate around the axis of rotor rotation (i.e., the rotor being fixed in all degrees of freedom except in rotation around the axis of rotor rotation), and a heat shroud. The turbocharger housing includes a turbine housing affixed to a bearing housing, and the turbine housing forms a radial scroll directing the exhaust gas stream inward toward an axis of rotor rotation.

The rotor includes an axial turbine wheel, a compressor wheel, and a shaft extending along the axis of rotor rotation and connecting the turbine wheel to the compressor wheel through the bearing housing. The turbine wheel is configured with a hub and a plurality of axial turbine blades. The hub defines a turbine-wheel back-disk surface that faces the bearing housing, and the bearing-housing defines a turbine-end-wall outer surface facing the turbine hub.

The turbocharger includes a heat shroud forming a curved portion that turns the radial scroll direction of the exhaust gas stream from a radial direction to an axial direction that flows toward the plurality of axial turbine blades with both axial and circumferential components. The heat shroud establishes a turbine-wheel back-disk cavity between the bearing-housing turbine-end-wall outer surface, the turbine-wheel back-disk surface, the curved portion of the heat shroud, and a cylindrical outer surface of a turbine-end portion of the shaft.

Advantageously, the invention includes one or more de-swirl elements extending through the turbine-wheel back-disk cavity, the de-swirl elements being sized, shaped and located within the turbine-wheel back-disk cavity to impede the circumferential flow of exhaust gas within the turbine-wheel back-disk cavity. These de-swirl elements significantly reduce the circumferential flow of the exhaust gas stream within the turbine-wheel back-disk cavity, and thereby convert the exhaust gas within the turbine-wheel back-disk cavity from having a high dynamic pressure and a low static pressure, to an exhaust gas stream having a low dynamic pressure and a high static pressure. As a result, the pressure difference between the turbine-wheel back-disk cavity and the interior of the bearing housing is significantly less likely to draw oil out of the bearing housing and into the turbine-wheel back-disk cavity.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 5 is a perspective view of a heat shroud that is depicted in the turbine-side portion of the turbocharger depicted in FIG. 3.

FIG. 6 is a side view of the heat shroud depicted in FIG. 5.

FIG. 7 is a cross-sectional view of the heat shroud depicted in FIG. 5, with the view rotated from a front view, around an axis of rotor rotation, such that a de-swirl vane of the heat-shroud is shown in cross-section.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a motor vehicle equipped with a gasoline powered internal combustion engine and a turbocharger. The turbocharger is equipped with unique elements that may reduce the likelihood of oil leakage from a bearing housing into a turbine.

Figure 1:
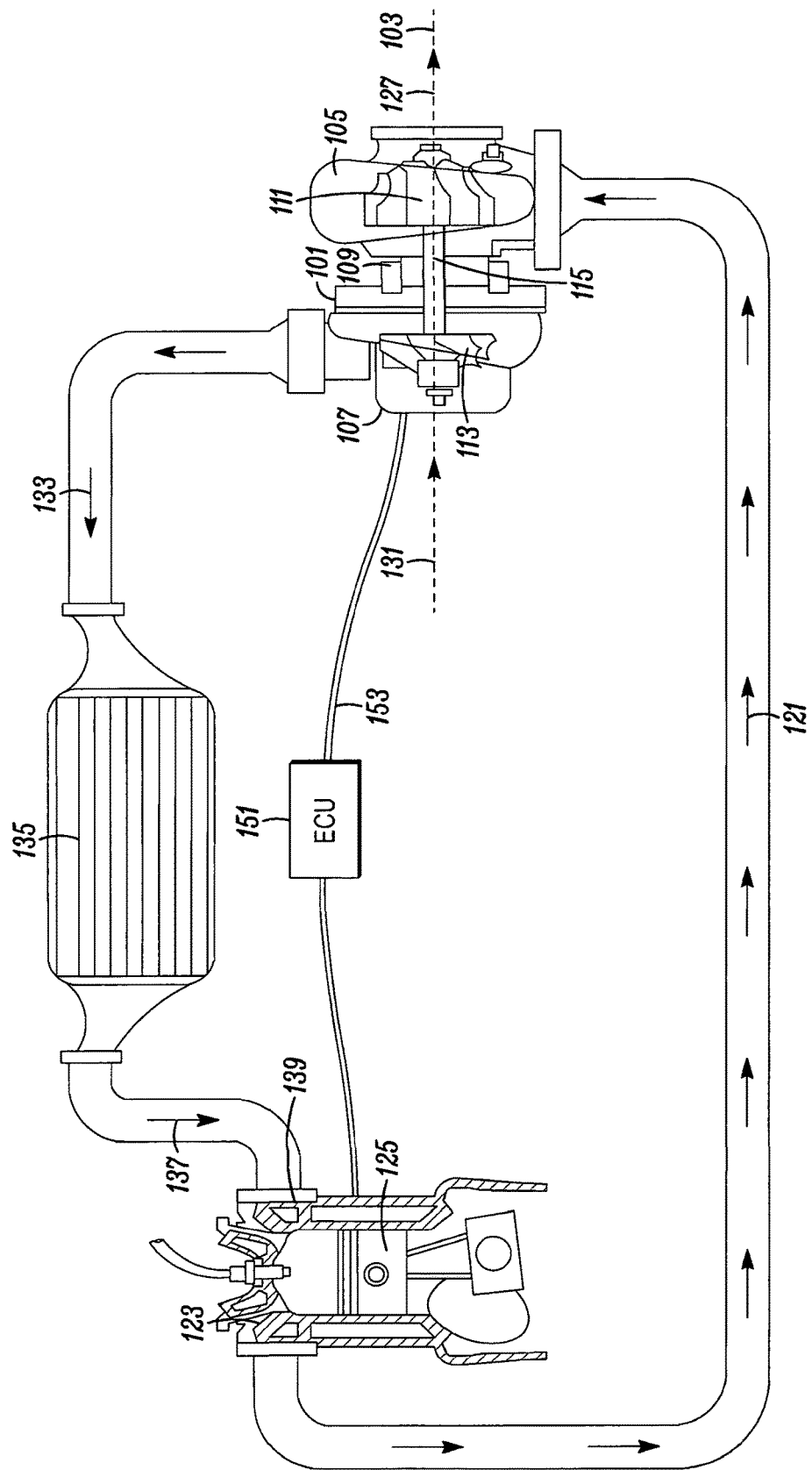
FIG. 1 is a system view of a prior art turbocharged internal combustion engine.
Figure 2:
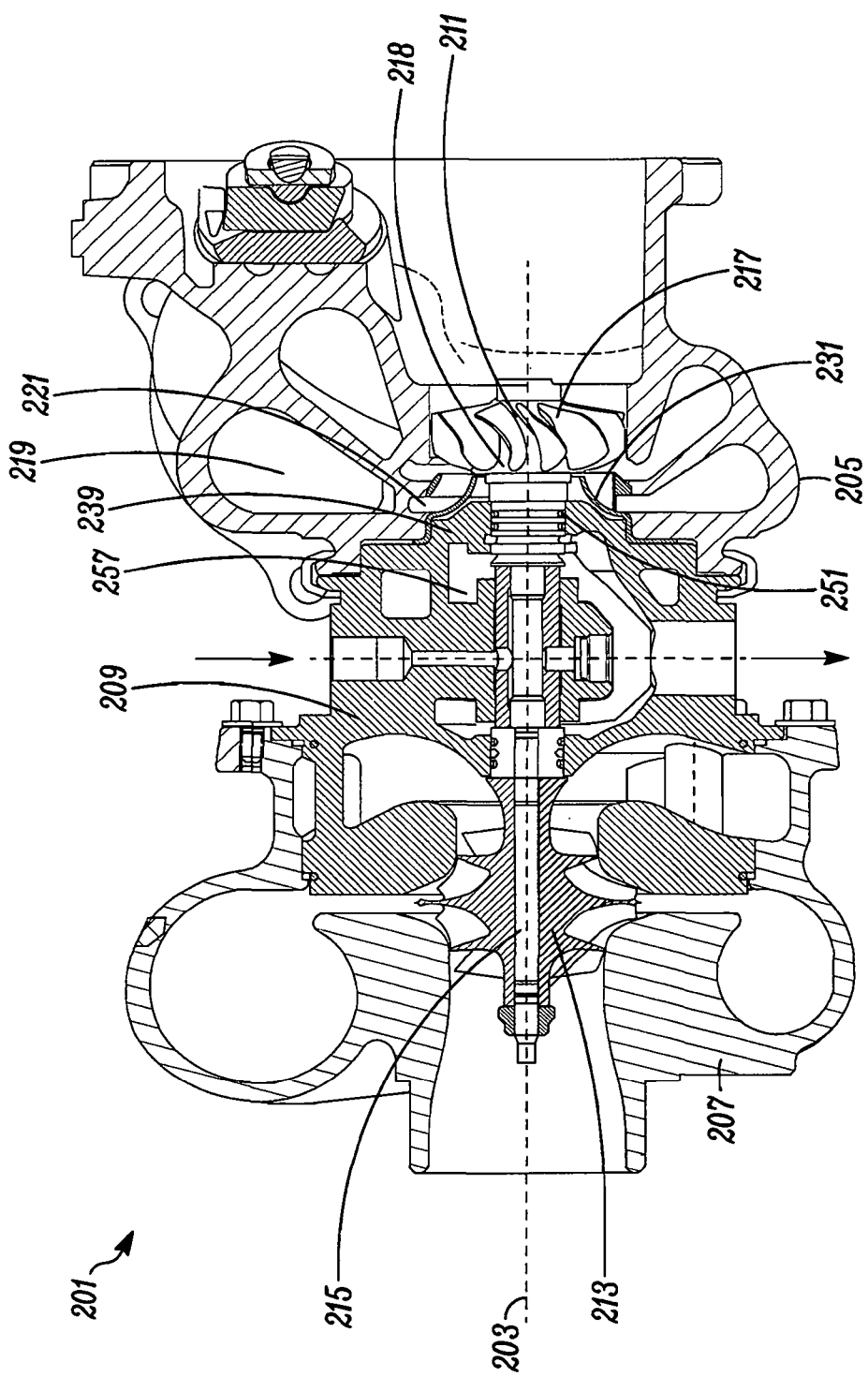
FIG. 2 is a cross-sectional front view of a turbocharger embodying the present invention.
Figure 3:
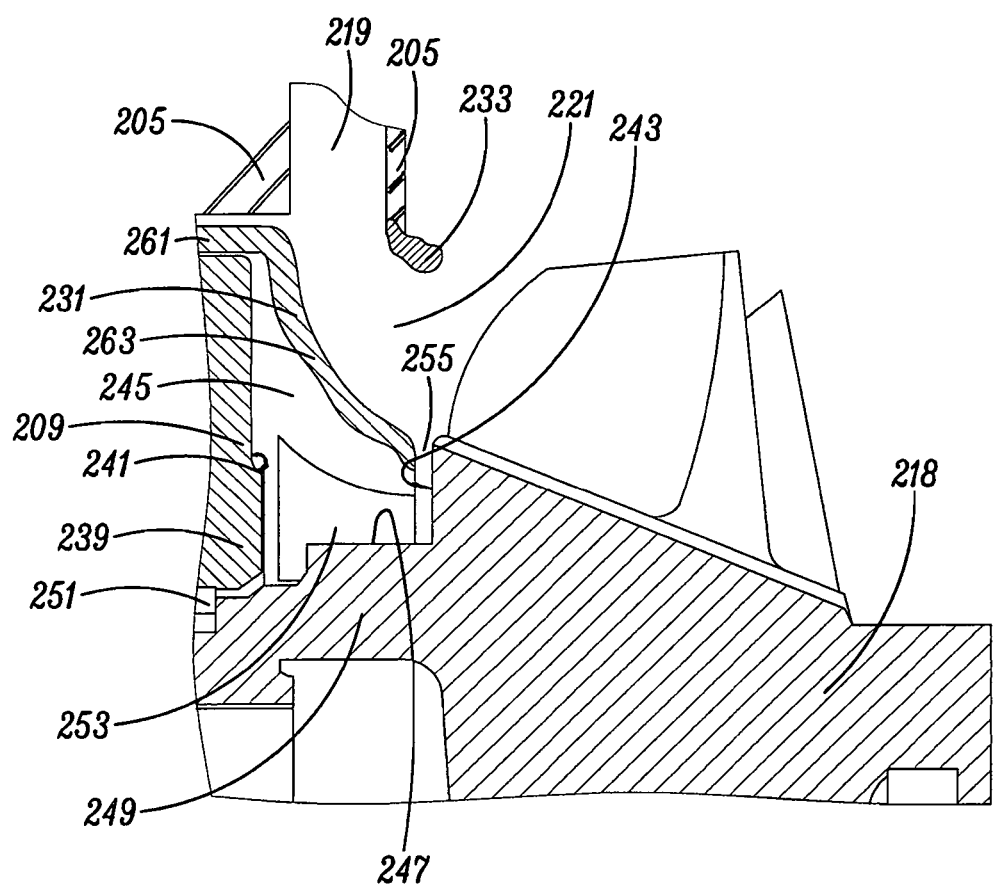
FIG. 3 is a cross-sectional front view of a turbine-side portion of the turbocharger depicted in FIG. 2.
Figure 4:
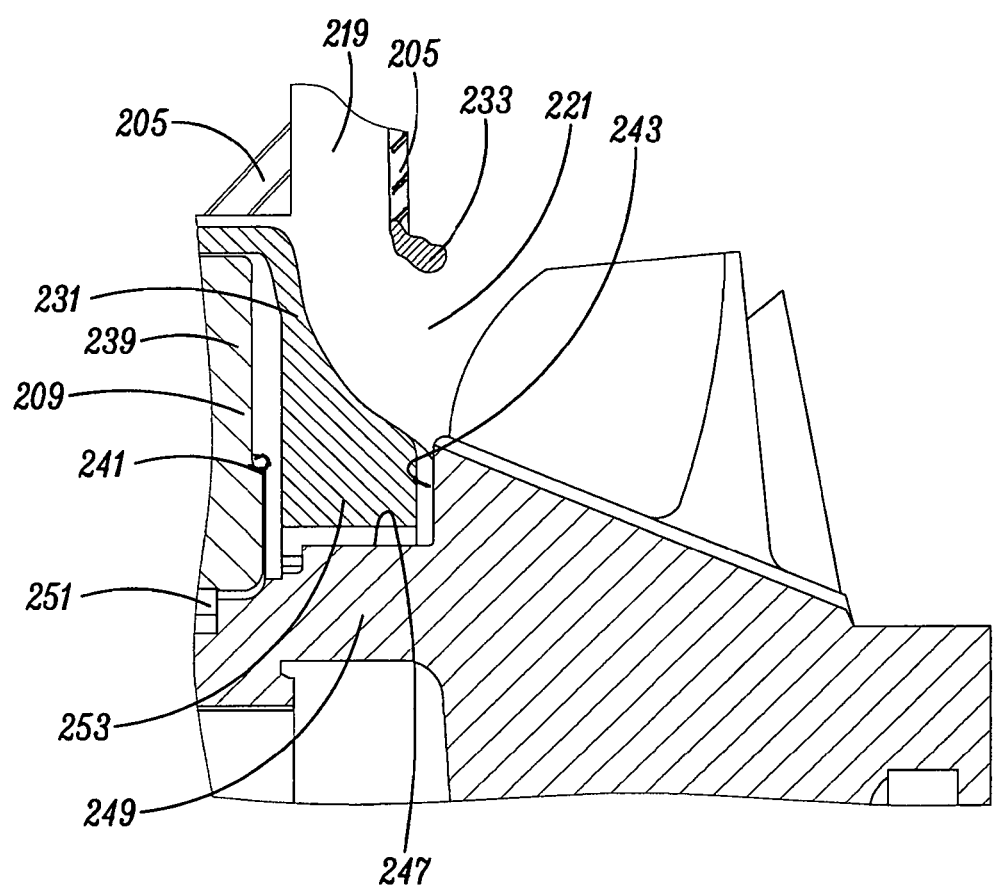
FIG. 4 is a cross-sectional view of the turbine-side portion depicted in FIG. 3, with the view rotated from the front view of FIG. 3, around an axis of rotor rotation, such that a de-swirl vane of a heat-shroud is shown in cross-section.

With reference to FIG. 2, in a first embodiment of the invention a typical internal combustion engine and ECU (and optionally an intercooler), such as are depicted in FIG. 1, are provided with a turbocharger 201 that includes a turbocharger housing and a rotor rotatably mounted within the turbocharger housing, being configured to rotate within the turbocharger housing along and around an axis of rotor rotation 203 on a set of bearings. The turbocharger housing includes a turbine housing 205, a compressor housing 207, and a bearing housing 209 that connects the turbine housing to the compressor housing. The bearings include oil-lubricated thrust bearings and two sets of oil-lubricated journal bearings.

The rotor includes an axial turbine wheel 211 located substantially within the turbine housing, a radial compressor wheel 213 located substantially within the compressor housing, and a shaft 215 extending along the axis of rotor rotation, through the bearing housing, to connect the turbine wheel to the compressor wheel and provide for the turbine wheel to drive the compressor wheel in rotation around the axis of rotation.

The turbine housing 205 and turbine wheel 211 form a turbine configured to circumferentially receive a high-pressure and high-temperature exhaust gas stream from an exhaust manifold of the engine (such as the exhaust gas stream 121 from the exhaust gas manifold 123, as depicted in FIG. 1). The turbine wheel (and thus the rotor) is driven in rotation around the axis of rotor rotation 203 by the high-pressure and high-temperature exhaust gas stream acting on a plurality of blades 217 mounted on a hub 218 of the turbine wheel. The exhaust gas stream becomes a lower total pressure exhaust gas stream while passing through the blades, and is subsequently axially released via a turbine outlet into an exhaust system (not shown).

The compressor housing 207 and compressor wheel 213 form a radial compressor. The compressor wheel, being driven in rotation by the exhaust-gas driven turbine wheel 211 (via the shaft 215), is configured to compress axially received input air (e.g., ambient air, or already-pressurized air from a previous-stage in a multi-stage compressor) into a pressurized air stream that may be ejected circumferentially from the compressor and sent on to an engine inlet (such as pressurized air stream 133 that is sent on to the engine inlet 139, as depicted in FIG. 1).

Turbine Volute

The turbine housing 205 forms one or more exhaust gas entrance passageways, each of which leads into one or more primary-scroll passageways 219 configured to receive the exhaust gas stream from the engine in a direction normal to and radially offset from the rotor axis of rotation 203. The one or more primary-scroll passageways each form a spiral adapted to significantly accelerate the speed of the gas stream to a high speed, which may be a supersonic speed for at least some operating conditions of the turbine (and its related engine).

With reference to FIGS. 2-7, the downstream end(s) of the one or more primary-scroll passageways 219 guide the accelerated exhaust gas into a turning passageway 221. Forming an inner side of the turning passageway (with respect to the axis of rotation 203) is a heat shroud 231, which is held in place between the turbine housing 205 and the bearing housing 209. The heat shroud includes a flange portion 261 and a curved portion 263.

An outer turning body 233 forms an outer side (with respect to the axis of rotation 203) of the turning passageway. The primary-scroll passageway(s) turn exhaust gas in the primary-scroll passageway(s) inwardly around the axis of rotation 203. The turning passageway turns the exhaust gas both inward and axially toward the axial turbine wheel 211, thereby achieving (for some standard operating conditions of the engine) a supersonic flow having both a downstream axial component parallel to the axis of rotation 203 and a downstream circumferential component.

Effectively, this configuration takes advantage of the conservation of angular momentum (rather than a convergent divergent nozzle) to achieve a high-speed airflow that may include a shockless transition to supersonic speeds for at least some operating conditions. Typically, a primary-scroll passageways 219 spiral characterized by a large radius change is required to achieve this change in velocity, and even though the resulting airstream is turned axially into an axial turbine wheel, it has a very high-speed circumferential component, and a very low static pressure.

The turbine hub 218 defines a turbine-wheel back-disk surface 243 facing the bearing housing 209. The bearing housing defines a turbine-end wall 239 having a turbine-end-wall outer surface 241 facing the turbine hub. A turbine-wheel back-disk cavity 245 is defined between the turbine-wheel back-disk surface, the turbine-end-wall outer surface, the curved portion 263 of the heat shroud 231, and a cylindrical outer surface 247 of a turbine-end portion 249 of the shaft 215. The turbine-wheel back-disk surface and the cylindrical outer surface of the turbine-end portion rotate with the shaft, while the turbine-end-wall outer surface and the curved portion of the heat shroud remain stationary with respect to the housing.

On a distal end, the turbine-end portion 249 of the shaft 215 is attached to the turbine wheel hub 218. A proximal end of the turbine-end portion of the shaft extends through a bore through the bearing-housing turbine-end wall 239 and extending into the bearing housing 209. Within that bore, a turbine-side oil seal is formed using one or more piston rings 251. This oil seal is relied upon to prevent the flow of bearing oil out of the bearing housing 209, into the turbine-wheel back-disk cavity 245, and subsequently through a small gap 255 between the heat shroud 231 (which is stationary) and the turbine-wheel back-disk 243 (which rotates). Such a flow would foul the turbine blades with burnt oil, and bleed off oil required for bearing operation.

Nevertheless, oil leaks through the turbine-side oil seal are possible in situations where there is a negative pressure gradient across the turbine-side oil seal (i.e., there is a lower pressure at the turbine side of the oil seal than there is at adjoining locations 257 within the bearing housing 209). One factor that can contribute to such a negative pressure gradient across the turbine side oil seal is the turbine operating at a low expansion ration (e.g., from 1.0 to 2.0). In such operating conditions, pressure in the turbine-wheel back-disk cavity 245 tends to be very low due to the fundamental energy exchange within the turbine.

Another factor that can contribute to such a negative pressure gradient across the turbine side oil seal is a high circumferential velocity within the turbine-wheel back-disk cavity 245. This circumferential velocity within the turbine-wheel back-disk cavity is caused both by tangential momentum exchange between the turning passageway 221 and the back-disk cavity (through the small gap 255 between the heat shroud 231 and the turbine-wheel back-disk 243), and by the viscous influence of the rotating turbine-wheel back-disk, and the rotating cylindrical outer surface 247 of the turbine-end portion 249 of the shaft 215. The presence of such a circumferential velocity means that a larger portion of the total pressure in the back-disk cavity is in the form of dynamic pressure rather than static pressure, contributing to a negative pressure gradient across the turbine side oil seal.

There are other factors that can also contribute to a negative pressure gradient across the turbine side oil seal. For example, smaller hub diameters at an axial turbine wheel inlet will worsen the negative pressure gradient. Likewise, for a variable nozzle turbine (i.e., one with turbine inlet vanes), the pressure gradient may be smaller, particularly with the vanes set to a smaller opening.

To reduce the negative pressure gradient across the turbine side oil seal, the turbocharger is provided with one or more stationary de-swirl elements within the turbine-wheel back-disk cavity 245. These de-swirl elements are configured (e.g., sized, shaped and located) to extend radially and axially across the turbine-wheel back-disk cavity to impede the circumferential flow of exhaust gas within the turbine-wheel back-disk cavity, and thereby reduce high circumferential velocities within the turbine-wheel back-disk cavity.

The de-swirl elements of this embodiment are a plurality (e.g., 12) of ribs 253 integrally formed as part of the heat shroud 231. These ribs are flat surfaces extending radially inward from the heat shroud and axially across the turbine-wheel back-disk cavity. The ribs extend to, within a safe operating margin (i.e., close to), the turbine-wheel back-disk 243 and the cylindrical outer surface 247 of the turbine-end portion 249 of the shaft 215 (both surfaces being rotating surfaces). The safe operating margin should be understood as the gap necessary to prevent contact between the stationary ribs and the rotating turbine-wheel back-disk, and between the stationary ribs and the cylindrical outer surface of the shaft turbine-end portion (throughout all standard operating conditions of the turbine during the operational life of the turbine). These ribs also extend close to or adjoin the bearing-housing turbine-end wall 239 (which is stationary).

It should be noted that the de-swirl elements could be integral to, affixed to, or held stationary relative to (e.g., structurally supported as one or more separate parts) any stationary part, e.g., the bearing housing 209 or the heat shroud 231. Moreover, they could be of a wide variety of shapes and orientations, so long as they impede the circumferential flow of exhaust gas within the turbine-wheel back-disk cavity 245 enough to prevent any substantial flow of bearing oil into the turbine-wheel back-disk cavity 245 and through the small gap 255 between the heat shroud 231 and the turbine-wheel back-disk 243.

It will typical be desirable for the de-swirl elements to have a simple and robust geometry, such that it is inexpensive to design and manufacture reliable de-swirl elements.

Alternate embodiments of de-swirl elements might include ribs angled into the circumferential flow direction so as to direct the circumferential flow into a stationary surface such as the body to which the ribs are affixed (e.g., into the heat shroud 231 if the rib is attached to the heat shroud, or into the bearing housing 209 if the rib is attached to the bearing housing). Other options (e.g., angled ribs directing circumferential flow into other objects) are also within the scope of the invention. Experimental verification may be used to confirm the successful operation of any particular individual configuration.

As the name suggests, the de-swirl elements substantially limit or prevent any significant circumferential flow within the turbine-wheel back-disk cavity 245. As a result, all or a large portion of the dynamic pressure is converted to static pressure, which prevents or very substantially limits the negative pressure gradient. Thus, oil leaks through the turbine-side oil seal (formed by the one or more piston rings 251) are substantially limited and/or prevented. Moreover, because the interaction between the turning passageway 221 and the turbine-wheel back-disk cavity 245 is vastly predominated by the flow through the turning passageway, the influence of the de-swirl elements on the flow within the turbine-wheel back-disk cavity has no significant influence on the flow through the turning passageway, and thus no negative impact on turbine performance.

In the present embodiment, the heat shroud 231 is comprised of a flange portion 261, a curved portion 263, and a plurality of de-swirl elements in the form of ribs 253. The flange portion forms a right angle that is rotationally symmetric around the axis of rotation 203. This provides for the heat shroud to be restricted in three translational dimensions and two rotational dimensions between the turbine housing 205 and the bearing housing 209 without being directly held by fasteners or any form of welding. The heat shroud is held with respect to the remaining rotational dimension (i.e., around the axis of rotation 203) by friction between the flange portion and the two housings (i.e., the turbine housing and the bearing housing). The curved portion 263 provides the inner side of the turning passageway 221 (with respect to the axis of rotation 203).

The invention is applicable both to single scroll turbines and turbines having a plurality of scrolls (e.g., a dual scroll turbine). Such multi-scroll turbines may include extended dividers that extend into the turning passageway 221.

It is to be understood that the invention comprises apparatus and methods for designing and producing the inserts, as well as for the turbines and turbochargers themselves. Additionally, the various embodiments of the invention can incorporate various combinations of the features described above. In short, the above disclosed features can be combined in a wide variety of configurations within the anticipated scope of the invention.

For example, while the described embodiment uses a wheel with cantilevered (i.e., free-ended) blades that are radially surrounded by an unmoving housing shroud, other embodiments employing a shrouded wheel (i.e., a wheel having an integral shroud that surrounds the blades and rotates with them) is within the scope of the invention.

While particular forms of the invention have been illustrated and described, it will be apparent that various modifications can be made without departing from the spirit and scope of the invention. For example, while the scroll was described as a radial scroll, the invention is also applicable to a mixed flow turbine. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A turbocharger configured to receive an exhaust gas stream from an engine, and to compress input air into a pressurized air stream, comprising:
   a turbocharger housing including a turbine housing affixed to a bearing housing, wherein the turbine housing forms a scroll directing the exhaust gas stream inward toward an axis of rotor rotation;
   a rotor rotatably mounted within the turbocharger housing to rotate around the axis of rotor rotation, the rotor including an axial turbine wheel, a compressor wheel, and a shaft extending along the axis of rotor rotation and connecting the turbine wheel to the compressor wheel through the bearing housing, wherein the turbine wheel is configured with a hub and a plurality of axial turbine blades, the hub defining a turbine-wheel back-disk surface facing the bearing housing, and wherein the bearing-housing defines a turbine-end-wall outer surface facing the turbine hub; and
   a heat shroud forming a curved portion that turns the scroll direction of the exhaust gas stream to an axial direction toward the plurality of axial turbine blades, the heat shroud establishing a turbine-wheel back-disk cavity between a bearing-housing turbine-end-wall outer surface, the turbine-wheel back-disk surface, the curved portion of the heat shroud, and a cylindrical outer surface of a turbine-end portion of the shaft; and
   one or more de-swirl elements extending through the turbine-wheel back-disk cavity, the de-swirl elements being sized, shaped and located within the turbine-wheel back-disk cavity to impede the circumferential flow of exhaust gas within the turbine-wheel back-disk cavity.

2. The turbocharger of claim 1, wherein the de-swirl elements are structurally supported by the heat shroud.

3. The turbocharger of claim 2, wherein the de-swirl elements are integral with the heat shroud.

4. The turbocharger of claim 1, wherein the de-swirl elements are structurally supported by a bearing-housing turbine-end wall.

5. The turbocharger of claim 4, wherein the de-swirl elements are integral with the bearing-housing turbine-end wall.

6. The turbocharger of claim 1, wherein the de-swirl elements are a plurality of flat ribs that extend radially and axially across the turbine-wheel back-disk cavity.

7. The turbocharger of claim 6, wherein the ribs extend, within a safe operating margin, to the turbine-wheel back-disk and the cylindrical outer surface of the turbine-end portion of the shaft.

8. The turbocharger of claim 1, wherein the scroll is a radial flow scroll.

* * * * *